(12) United States Patent
Strasser et al.

(10) Patent No.: US 7,641,278 B2
(45) Date of Patent: Jan. 5, 2010

(54) PASSENGER SEAT, ESPECIALLY AIRLINE PASSENGER SEAT

(75) Inventors: Ulrich Strasser, Ravensburg (DE); Hartmut Schürg, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 90 days.

(21) Appl. No.: 11/885,166

(22) PCT Filed: Mar. 17, 2006

(86) PCT No.: PCT/EP2006/002441

§ 371 (c)(1),
(2), (4) Date: Aug. 28, 2007

(87) PCT Pub. No.: WO2006/111227

PCT Pub. Date: Oct. 26, 2006

(65) Prior Publication Data
US 2008/0265638 A1  Oct. 30, 2008

(30) Foreign Application Priority Data
Apr. 19, 2005  (DE) ............... 10 2005 017 879

(51) Int. Cl.
A47C 7/62   (2006.01)
B60N 2/34   (2006.01)
B64D 11/06  (2006.01)

(52) U.S. Cl. .............. 297/184.14; 297/184.1; 297/184.11; 297/118; 244/118.6; 244/122 R

(58) Field of Classification Search .......... 297/118, 297/184.1, 184.14, 188.01, 188.14, 188.15, 297/188.16, 188.17; 244/118.5, 118.6, 122 R
See application file for complete search history.

(56) References Cited

U.S. PATENT DOCUMENTS

| | | | | |
|---|---|---|---|---|
| 5,857,745 A | * | 1/1999 | Matsumiya | 297/184.14 X |
| 5,954,401 A | * | 9/1999 | Koch et al. | 297/184.14 X |
| 6,113,183 A | | 9/2000 | Koch et al. | |
| 6,170,786 B1 | * | 1/2001 | Park et al. | 297/188.16 X |
| 6,742,842 B2 | * | 6/2004 | Dowty | 297/184.14 X |
| 7,178,871 B1 | * | 2/2007 | Round et al. | 297/244 |
| 7,318,622 B2 | * | 1/2008 | Rezag et al. | 297/118 |
| 7,517,010 B2 | * | 4/2009 | Saint-Jalmes et al. | 297/118 |

(Continued)

FOREIGN PATENT DOCUMENTS

DE   195 41 567   1/1997

(Continued)

*Primary Examiner*—Rodney B White
(74) *Attorney, Agent, or Firm*—Posz Law Group, PLC

(57) ABSTRACT

Disclosed is a passenger seat, especially an airline passenger seat, comprising seat components such as a seat part, a backrest, and an armrest (3), at least one of which is movably disposed relative to the other seat components to adjust the position, and a partition (9, 11) that can be transferred between an operational position in which the same extends in a lateral shielding area of the seat and a non-operational position in which the same unblocks the shielding area. The partition is composed of several wall parts (9, 11) which extend in the shielding area in the operational position and interact via a guiding device (43, 45) such that the movement of one wall part (9) during the transfer between the non-operational and the operational position entrains another wall part (11).

11 Claims, 3 Drawing Sheets

U.S. PATENT DOCUMENTS

| | | |
|---|---|---|
| 7,568,759 B2 * | 8/2009 | Schurg .................... 297/184.1 |
| 2003/0085597 A1 | 5/2003 | Ludeke et al. |
| 2003/0146654 A1 | 8/2003 | Nguyen et al. |
| 2004/0004382 A1 | 1/2004 | Dowty |
| 2004/0036336 A1 * | 2/2004 | Veneruso ............. 297/184.1 X |
| 2007/0085389 A1 * | 4/2007 | Schurg .................... 297/184.1 |

FOREIGN PATENT DOCUMENTS

| | | |
|---|---|---|
| EP | 0 773 134 | 5/1997 |
| EP | 1 236 642 | 9/2002 |

\* cited by examiner

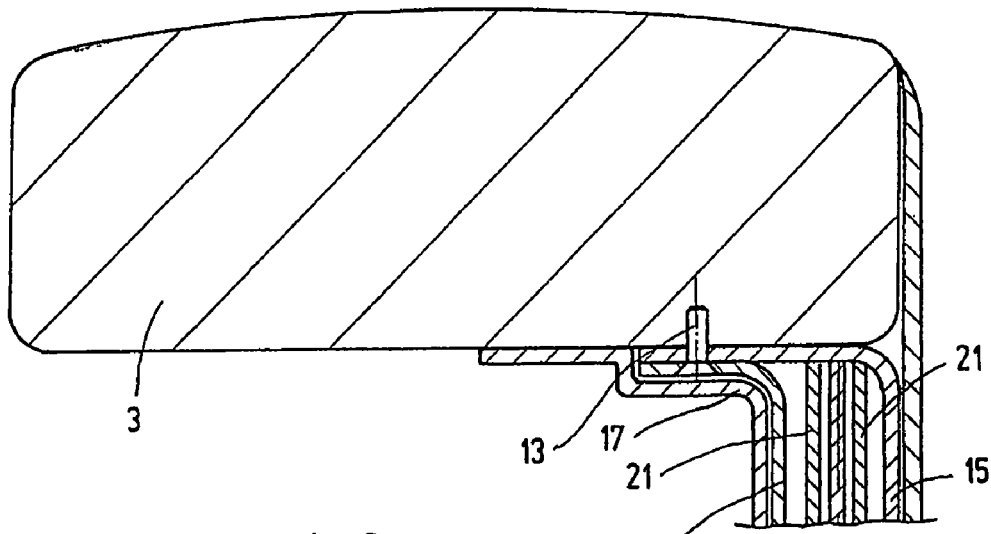
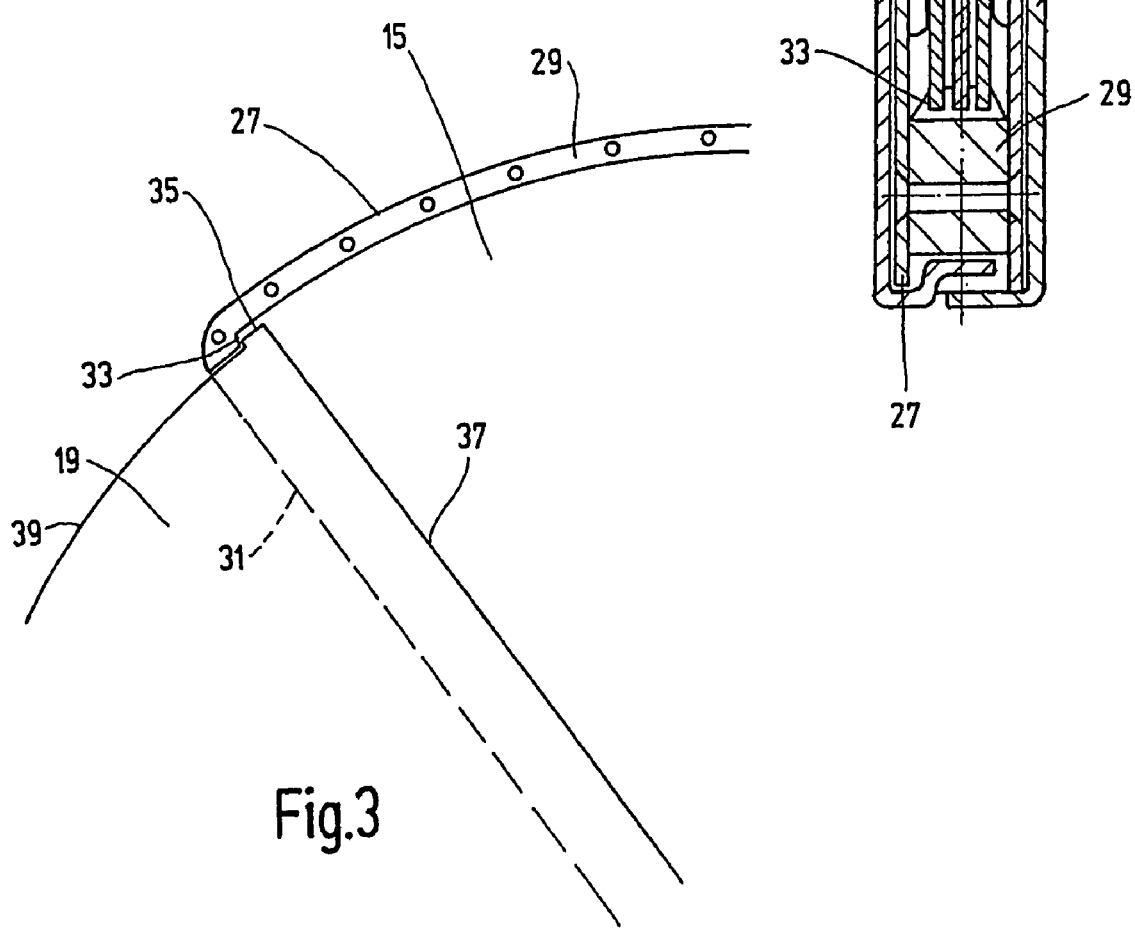

PASSENGER SEAT, ESPECIALLY AIRLINE PASSENGER SEAT

The invention relates to a passenger seat, especially an airline passenger seat, comprising seat components such as a seat part, a backrest and an armrest, of which at least one component is arranged to move for positional adjustment relative to other seat components and with a partition, which extends between a deployed position, in which it extends in a lateral shielded area of the seat and can make the transition into a non-use position in which it exposes the shielded area.

Passenger seats of this type are known, cf. DE 101 32 282 A1. In the case of means of transportation, such as commercial aircraft with rows of seats, where several seats are arranged next to one another, an attempt is made to make available as much privacy as possible to passengers sitting next to one another. The possibility of forming screening between two seats next to one another by a partition that makes the transition into its deployed position accommodates this ambition, in particular if an extensive partition covers a correspondingly extensive shielded area. In the case of passenger seats for means of transportation, in particular in aircraft seats, this purpose is difficult to achieve, however, because of structural factors. The partition in such seats in the non-use position is recessed in a lateral bracket corresponding to an associated armrest, from which it is retracted during the transition into the deployed position. Since mechanical and/or electrical seat-accessory systems are to be installed within such seat brackets, only a limited amount of stowage space is available within the bracket for the partition, which means that there is not enough room for the partition.

Starting from this prior art, the object of the invention is to provide a passenger seat, in particular an aircraft seat, which despite limited stowage space, which is available to install the partition in the non-use position, offers the possibility of an extensive sizing of the partition.

According to the invention, this object is achieved by a passenger seat that has the features of claim 1 in its entirety.

By the division of the partition, provided according to the invention (see characterizing part of claim 1), into several wall parts, which extend into the deployed position in the shielded area and interact with one another via a guide device, so that the movement of a wall part entrains another wall part during the transition between the non-use position and the deployed position, the stowage space to be provided for the non-use position does not, to a large extent, need to be adapted to the total dimensions of the partition, i.e., to the total size of the shielded area, but rather only to the dimensions of the individual wall parts. The latter can be installed individually in the stowage space within the bracket, for example lying next to one another.

In an advantageous embodiment, a first wall part is pivot-mounted by a pivoting movement of an armrest that is connected thereto and can be adjusted in position and interacts via the guide device with at least a second wall part that can pivot. Such embodiments are distinguished not only by an especially simple operability, since simple pivoting, i.e., folding-up the armrests from the normal deployed position moves the partitions into the deployed position, but rather the pivotable stowage of both wall parts results also in an especially simple structure, in particular with respect to the configuration of the guide device, which can be designed in the form of a simple coupling device for a combined pivoting movement of corresponding wall parts.

Instead of the two-part design of the partition, in addition to the second wall part, at least one other pivotable wall part or a still greater number of pivotable wall parts could be present, the respective wall parts being able to interact with one another for their entrainment with relevant additional guide devices.

In an especially advantageous way, the wall parts are designed as flat shielding elements, which in the non-use position are accommodated, lying side by side, below the armrest in a seat bracket that can pivot in the recessed deployed position.

An especially compact type of design is produced in embodiments in which one of the wall parts is formed from two shield elements that lie next to one another at a small distance between which in the non-use position, at least a majority of the shield surface area of the shield element of another wall part in each case is accommodated. In the non-use position, in this connection, the wall parts are closely nested in one another, so that a minimum space requirement is produced. If the guide device is designed so that even in the deployed position a gap, even if small, exists between adjoining wall parts, then it is ensured that no visible gap is present between adjoining wall parts in the deployed position.

In advantageous embodiments, both the first wall part associated with the armrests and the second wall part interacting with the guide device with the latter are both pivot-mounted around the pivot axis of the armrests. In such embodiments, the guide device can be formed in a constructively simple way by a carrier device that has a driver pin on the first wall part and a stop that is provided for the interaction with this pin on the second wall part, driver pins and stops being positioned on the wall parts in question relative to one another so that the first wall part in its pivoting movement starts to move from the non-use position at the stop of the second wall part only when the first wall part has passed through the part of the shielded area, which can be overlapped in the deployed position by the second wall part, so that the second wall part at the end of the movement of the first wall part comes into the position in which it forms the complete cover of the shielded area in combination with the first wall part.

If it is advantageous in matching the structural conditions of the bracket area, the second wall part, which interacts with the first wall part that can pivot with the armrest on the same axis via the guide device, can for its part be pivot-mounted around a pivot axis that has a distance from the pivot axis of the armrest. This pivot axis of the second wall part can be arranged in the area below the front free end of the armrest that is located in the lowered deployed position on the structure of the seat bracket. In such embodiments, the possibility exists to form the guide device between interacting wall parts by a slot/pin connection, in which a guide pin located on a wall part extending crosswise to the pivot axes engages in a guide slot that is made in the wall part to be entrained.

Below, the invention will be explained in detail based on the embodiments shown in the drawing. Here:

FIG. 2 shows a sectional view of a pivotable armrest that is enlarged compared to FIG. 1 and partially shortened and a partition that is located in a non-use position with a first and a second wall part, which can be pivoted around the pivot axis of the armrests;

FIG. 3 shows a diagrammatic sketch for illustrating the carrier function of a guide device via which the first wall part and the second wall part of the embodiment interact with one another;

Figure 1:
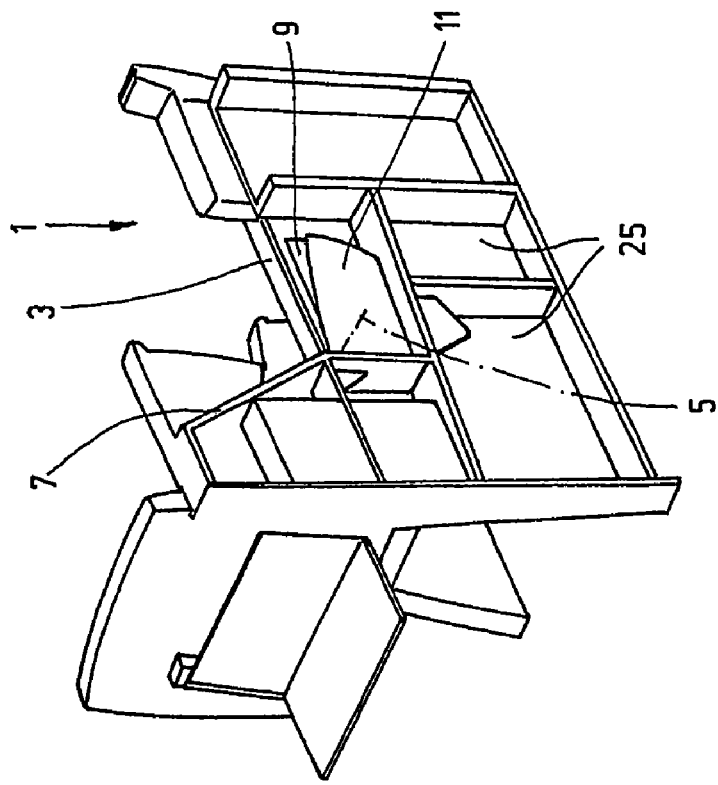
FIG. 1 shows a greatly diagrammatically simplified and perspective oblique view only of the supporting structure of an embodiment of the seat according to the invention in the form of an aircraft seat, whereby in a lateral seat bracket, a partition that is run into it, in the non-use position, can be seen.
Figure 4:
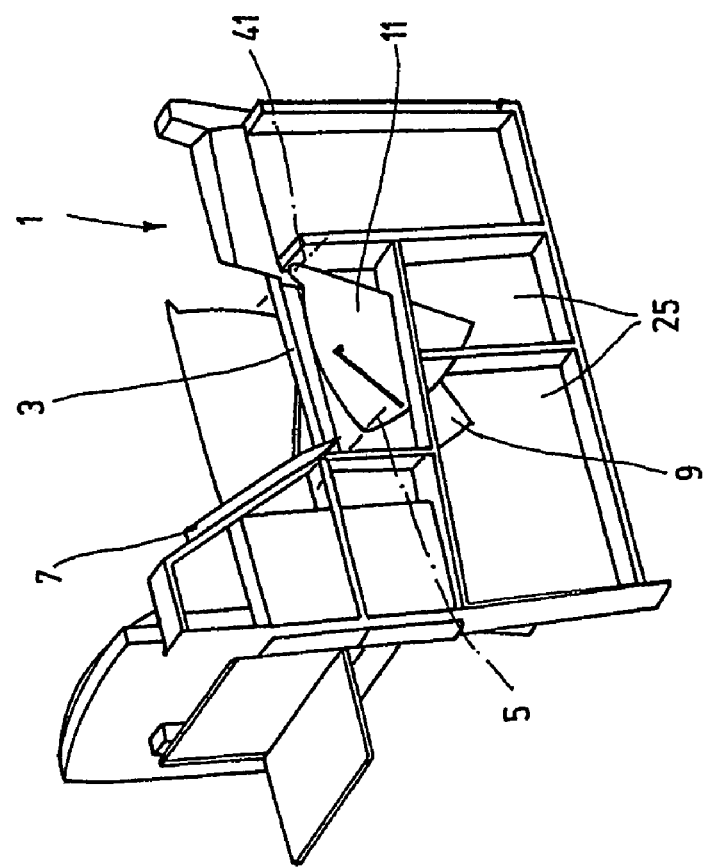
Figure 5:
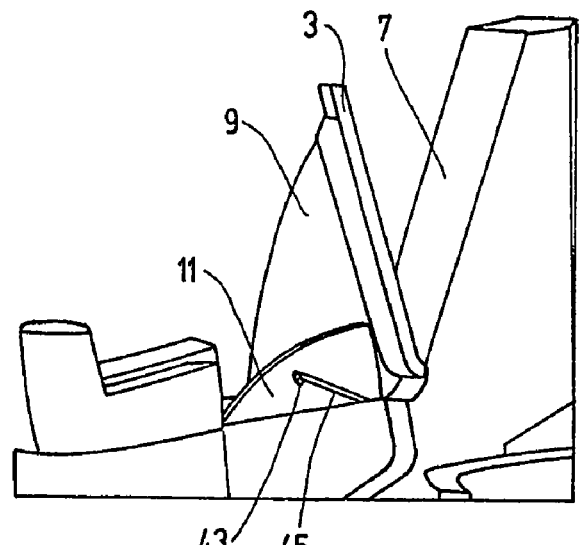
Figure 6:
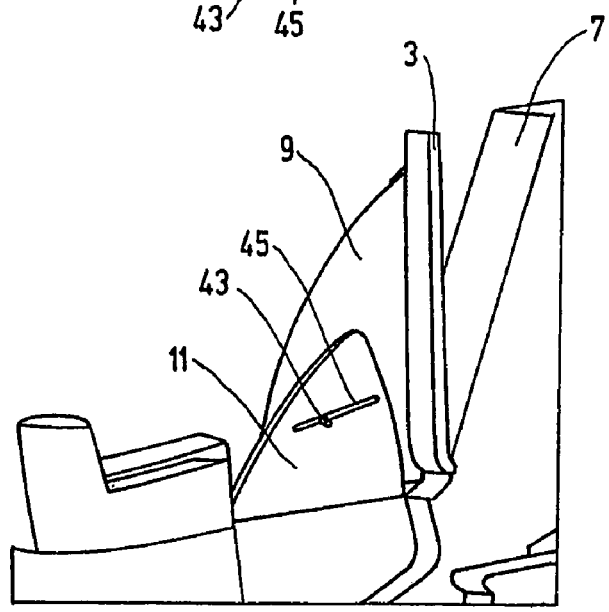
Figure 7:
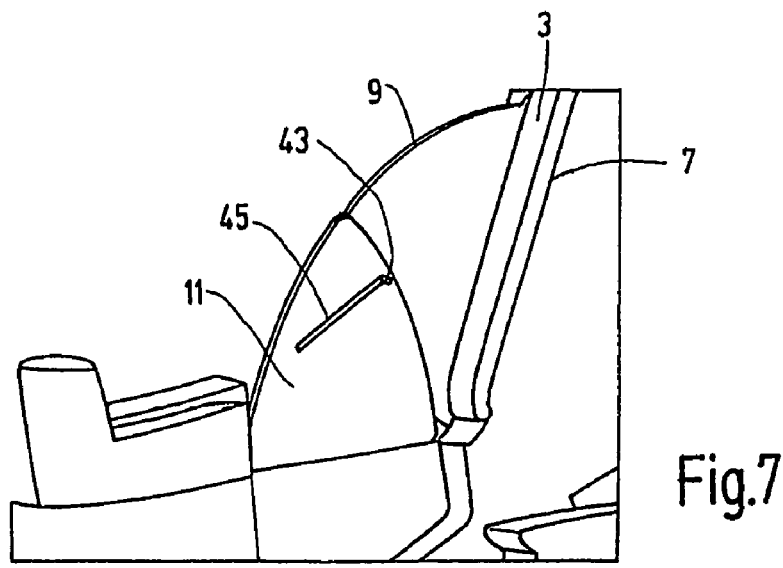

FIG. 4 shows a diagrammatic representation, similar to FIG. 1, of a second embodiment of the seat according to the invention with a partition run into a seat bracket and located in the non-use position, and FIGS. 5 to 7 compared to FIG. 4 show on an enlarged scale a perspective partial representation of the embodiment of FIG. 4, whereby as the partition makes the transition into the deployed position, the states of operation are shown with armrests pivoted by 70° or armrests pivoted by 90° or the state of complete deployment is shown.

In this description, the invention is explained in the example of an aircraft seat. It goes without saying that the invention can be implemented in a corresponding way even with seats for other means of transportation, for example, ferries, train cars, etc. By one aircraft seat, which forms part of a series of seats, otherwise not shown, FIG. 1 shows only carrying structural elements, without lining, upholstery or accessory devices, a center bracket being referred to as a whole by 1 and forms the delineation from the next seat to it (which is not shown). An armrest 3, which is located in FIG. 1 in its recessed horizontal deployed position, is stowed on the structure of the bracket 1 around a pivot axis referred to as 5, so that it can be pivoted from its deployed position, shown, upward against a structural element 7 which, relative to the direction of flight, is slightly tilted toward the rear.

In the embodiment of FIG. 1, which is illustrated in greater detail by FIGS. 2 and 3, a partition that is run into the bracket 1 and is located in the non-use position is found below the armrest 3. The latter has a first wall part 9 and a second wall part 11, which both can be pivoted around the pivot axis 5 of the armrests 3, the first wall part 9 being connected to the armrest 3 and thus being able to pivot directly together with the latter. The second wall part 11 can be mounted to rotate freely on the pivot axis 5.

FIG. 2 shows that the first wall part, which is connected to the armrest 3 by means of threaded joint 13, is formed from two shield elements 15 that run next to one another in parallel planes, in which there are thin plate-like components that consist of plastic or a light metallic material. The shield elements 15, as are illustrated by the interrupted drawing area in FIG. 2, are depicted very greatly shortened and are bonded on their outside by a coating that consists of a lining film 17. The second wall part 11 is one-piece in contrast to the first wall part 9, i.e., it has only one shield element 19, which, just like the shield element 15, is a thin plate that consists of metal or plastic, which also is coated on the outside by lining films 21.

The shield element 19 that forms the second wall part 19 is seated between the shield elements 15 of the first wall part, to form an upholstered guide for the relative movement between the first and second wall part, frieze strips 23 being arranged between the shield elements 15 and the lining film 21 of the shield element 19, the frieze strips 23 being glued to the shield elements 15 in the example that is shown.

The components that are shown in the sectional view are not only greatly shortened in length according to the break area indicated in FIG. 2, but for the sake of clarity, the dimensions of thickness are slightly exaggerated. In the non-use position shown in FIG. 1, the second wall part that is formed by the shield element 19 is seated essentially holohedrally within the first wall part, i.e., between its shield elements 15. The size of the stowage space, which is required within the bracket 1 for accommodating the partition that is located in the non-use position, therefore essentially corresponds only to the size of the first wall part 9 that is formed by the shield element 15. Thus, although the total size of the shielded area to be covered by the partition corresponds to the combined surface size of the first wall part 9 and the second wall part 11, free installation space 25 remains inside the bracket 1 for the accommodation of additional devices that are necessary for modern seat systems, such as electric equipment, control and servo systems for adjustment mechanisms, etc.

As can be seen from FIGS. 2 and 3, the shield elements 15, which have the form of a circular sector with an edge 27 shaped like a circular arc to the pivot axis 5, are connected along this edge 27 by a spacing strip 29, which ensures the parallelism of the shield element 15. As FIG. 3 shows, the spacing strip 29 forms a driver pin 33 that projects slightly radially inward near the straight end edge 31 of the shield element 15. The latter interacts with a driver nose 35 that projects slightly outward radially and is located on the peripheral edge 39, shaped like an arc of a circle, of the shield element 19, which is also shaped like an arc sector, especially in the area of its edge 37, which forms the leading edge in the pivot movement in the deployed position.

In this positional relationship between driver pin 33 and the driver nose 35 on the shield element 19 of the second wall part 11, a guide device is formed, which first moves the shield element 15 of the first wall part 9 from the bracket 1 when the partition makes the transition into the deployed position and then entrains the second wall part when the pin 33 pushes on the nose 35 (shield element 19). Thus, it is achieved that at the end of the pivoting movement of the armrests 3 and thus the first wall part 9, the second wall part 11 (shield element 19) together with the first wall part 9 form the total cover of the shielded area. Since the shield element 19 that forms the second wall part 11 is freely movable in the pivot axis 5, it returns in a pivoting movement of the armrest 3 from the position corresponding to the deployed position of the partition into the horizontal deployed position in the corresponding pivoting movement of the first wall part 9 (shield element 15) under the effect of gravity automatically into the pivoting position run into the bracket 1, in which it rests against an end stop, not shown.

In the example that is shown, see FIGS. 2 and 3, the first wall part 9 with two shield elements 15 is in two parts, while the second wall part 11 with one shield element 19 is in one part, and engages between the shield element 15 of the first wall part 9. As an alternative, the arrangement could be made such that the first wall part 9 is in one part and engages between two shield elements of the second wall part 11 that is designed in two parts.

FIGS. 4 to 7 show a second embodiment with a partition that is also formed from a first wall part 9 and a second wall part 11. An essential difference relative to the first-described embodiment consists in that only the first wall part 9 is pivot-mounted around the pivot axis 5 of the armrest 3, while the second wall part 11 can pivot around a second pivot axis 41. The latter is found in the example that is shown below the front end of the armrest 3 in the structure of the bracket 1. The first wall part 9 is in turn connected to the armrest 3 and therefore can be pivoted by the latter in the positional adjustment of the armrest 3.

Another difference relative to the first-described example consists in the design of the guide device, which entrains the second wall part 11 in the movement of the first wall part 9. As can be seen in particular from FIGS. 5 to 7, the guide device is formed by a pin/slot connection, in which a driver pin 43 that laterally projects on the first wall part 9 engages in a guide slot 45 in the wall part 11.

In turn, as in the first-described embodiment, the relative positional relationships of pin 43 and slot 45 are selected so that during transition from the non-use position into the deployed position of the first wall part to the second wall part, it is entrained so that when the armrest 3 is completely pivoted upward, i.e., the first wall part 9 is retracted completely from the bracket 1, the second wall part 11 is entrained by being pivoted by its separate pivot axis 41, so that it forms the complete cover of the shielded area together with the first wall part 9.

FIGS. 5 to 7 show the movement phases, FIG. 5 showing the initial phase of driving armrest 3 pivoted upward at around 70°, FIG. 6 showing the state of armrest 3 pivoted at 90°, and FIG. 7 showing the final state in the deployed position, the wall parts 9 and 11 in combination covering the entire shielded area and the armrest 3 being pivot-mounted on the structural element 7.

As in the first-described embodiment, one of the wall parts 9, 11 can be designed in two parts with parallel shield elements, between which the respective other wall part, consisting of only one shield element, engages. In this connection, the driver pin 43 preferably extends between the shield elements of the two-part wall part, the guide slot 45 being designed in the one-part wall part that engages between these shield elements.

The invention claimed is:

1. A passenger seat comprising
   a seat part;
   an armrest, which is arranged to move in a pivotal movement for positional adjustment relative to the seat part between a lowered use position and a swiveled up non-use position;
   a partition, which is movable between a deployed position, in which the partition extends in a lateral area of the seat and builds a shielding of the lateral area, and a non-use position, in which the partition exposes the lateral area, wherein the partition consists of a first wall part and at least a second wall part that extend into the lateral area in the deployed position and;
   a guide device, which is configured such that the wall parts interact with one another via the guide device, and the movement of one of the wall parts during transition between the non-use position and deployed position of the partition entrains the other wall part, wherein
   the armrest is connected to the first wall part,
   the first wall part and the second wall are pivotal,
   the first wall part can pivot by pivoting movement of the armrest, and
   the first wall part can be adjusted in position and interacts via the guide device with at least the second pivotal wall part.

2. The passenger seat according to claim 1, wherein in addition to the first and second wall part, at least third pivotal wall part is present, and the respective wall parts interact with one another for their entrainment during the transition between non-use position and deployed position of the partition via suitable additional guide devices.

3. The passenger seat according to claim 1, wherein the wall parts are designed as flat shield elements, which, in the non-use position of the partition, are seated next to one another in a seat console below the pivotal armrest located in the lowered use position of the armrest.

4. The passenger seat according to claim 1, wherein in the pivoting movement of the armrest from the lowered use position of the armrest moves the first wall part and during the pivoting movement of the armrest the guide device entrains the second wall part into a position that forms a partial cover of the lateral area, in which the wall parts are adjacent to one another to form an essentially uninterrupted shield surface with associated edge areas.

5. The passenger seat according to claim 1, wherein one of the wall parts is formed from two shield elements that lie next to one another at a short distance, between which a shield element of the other wall part is seated in the non-use position of the partition with at least a majority of its shield surface area.

6. The passenger seat according to claim 1, wherein the first wall part, which is connected to the armrest, and the second wall part, which interacts with the first wall part via the guide device, are pivot-mounted around a pivot axis of the armrest.

7. The passenger seat according to claim 1, wherein the guide device has a driver contour, which is attached to the first wall part, and a stop, which is provided on the second wall part for interaction with the driver contour, and wherein the driver contour and the stop are attached to the corresponding wall part in such a relative positional relationship that the first wall part entrains the second wall part during the transition into the deployed position of the partition.

8. The passenger seat according to of claim 1, wherein the second wall part, interacting via the guide device with the first wall part, which can pivot around a pivot axis of the armrest, is pivot-mounted around a second pivot axis that is located at a distance from the pivot axis of the armrest.

9. The passenger seat according to claim 8, wherein the wall parts in the non-use position of the partition are seated next to one another in a seat console below the pivotal armrest located in the lowered use position of the armrest, and the pivot axis of the second wall part is arranged in an area below a front free end of the armrest that is located, in the use position of the armrest, on the seat console.

10. The passenger seat according to claim 9, wherein the guide device is formed between the wall parts by a slot/pin connection, in which a guide pin that is located on one of the wall parts that extends crosswise to the pivot axes engages in a guide slot made in the other wall part, which is to be entrained.

11. A passenger seat comprising
    a seat part;
    an armrest, which is pivotal relative to the seat part between a lowered, use position and a raised, non-use position;
    a partition, which is movable between a deployed position, in which the partition is raised to form a generally vertical shield at a side of the seat, and a stowed position, in which the partition is lowered to a storage position, wherein
       the side of the seat is unpartitioned and the seat is laterally exposed when the partition is in the storage position, and
       the partition includes at least first and second wall parts, and
       each of the first and second wall parts is pivotal;
    a guide device, by which the wall parts cooperate with one another, wherein pivotal movement of the first wall part, during a transition between the storage position and the deployed position of the partition, causes the first wall part to entrain the second wall part, wherein
       the armrest is coupled to the first wall part so that the first wall part pivots to a raised position in response to pivotal movement of the armrest to the raised, non-use position of the armrest, and
       the first wall part cooperates with the second wall part through the guide device to cause the second wall part to pivot into a raised position in response to movement of the first wall part.

* * * * *